United States Patent
Hotta et al.

(10) Patent No.: US 6,823,885 B2
(45) Date of Patent: Nov. 30, 2004

(54) LIQUID DRAINS HAVING LIQUID LEVEL ADJUSTING MECHANISMS

(75) Inventors: Akihisa Hotta, Aichi-ken (JP); Koichi Suda, Aichi-ken (JP); Kiyoshi Yoshizumi, Aichi-ken (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/359,307

(22) Filed: Feb. 6, 2003

(65) Prior Publication Data

US 2003/0155007 A1 Aug. 21, 2003

(30) Foreign Application Priority Data

Feb. 8, 2002 (JP) ........................................ 2002-032817

(51) Int. Cl.[7] .............................................. F16K 31/20
(52) U.S. Cl. ....................................................... 137/192
(58) Field of Search ........................................ 137/192

(56) References Cited

U.S. PATENT DOCUMENTS 6,009,898 A * 1/2000 Risch et al. ................. 137/388

FOREIGN PATENT DOCUMENTS

| JP | 62-75393 | 4/1987 |
| JP | 07-092195 | 4/1995 |
| JP | 09-329271 | 12/1997 |

OTHER PUBLICATIONS

Abstract of French Publication No. 2,563,336, Published Oct. 25, 1985.

* cited by examiner

Primary Examiner—Gerald A. Michalsky
(74) Attorney, Agent, or Firm—Dennison, Schultz, Dougherty & MacDonald

(57) ABSTRACT

A liquid drain (2) includes a drain body (20). The drain body defines a float chamber (30) that is adapted to store a liquid. A liquid level adjusting mechanism serves to adjust the liquid level within the float chamber and includes a float (40; 240; 340; 440; 540). The float has a float body (42; 242; 342; 442; 542) that is adapted to float on the liquid surface within the float chamber. A damper (43; 46; 243; 343; 443) may inhibit or minimize a shaking phenomenon of the float body due to waving of the liquid within the float chamber.

22 Claims, 8 Drawing Sheets

LIQUID DRAINS HAVING LIQUID LEVEL ADJUSTING MECHANISMS

This application claims priority to Japanese patent application serial number 2002-032817, the contents of which are incorporated herein by reference.

BACKGROUND OF THE INVENTION

1. Technical Field

The present invention relates to liquid drains. In particular, the present invention relates to liquid drains that include a float for controlling a liquid level.

2. Description of the Related Art

A vertical cross sectional view of a known liquid drain 102 is shown in FIG. 18. The liquid drain 102 includes a drain body 120, a valve seat 134, a float valve 136 and a float 140.

A float chamber 130 is defined within the drain body 120 in order to store a liquid (e.g., water). A liquid inlet port 131 is formed on a top wall of the drain body 120 and communicates with a liquid outlet port (not shown) formed on a gas/liquid separator 101. The gas/liquid separator 101 may separate a mixed gas/liquid flow that may contain a gas (e.g., hydrogen gas) and relatively small liquid particles (e.g., water particles) into the gas and the liquid. The liquid separated by the separator 101 may flow into the float chamber 130 via the liquid outlet port and the liquid inlet port 131.

The valve seat 134 defines a drain hole 135 and the liquid stored in the float chamber 130 can be discharged through the drain hole 135. In addition, a liquid discharge channel 133 extends from the drain body 120. One end of the liquid discharge channel 133 communicates with the drain hole 135 and the other end of the liquid discharge channel 133 communicates with the atmosphere. A check valve 132 is disposed within the liquid discharge channel 133 in order to prevent liquid counter flow.

The float valve 136 may be designed as a needle valve and may be vertically movably disposed within the valve seat 134. The float valve 136 may open and close the drain hole 135 as the float valve 136 moves upward and downward.

The float 140 may include a float lever 141 that can move together with a float body 142. The float body 142 may float on the surface of the liquid stored within the float chamber 130. The float lever 141 is coupled to the float valve 136 fixed to the float body 142. The float lever 141 is pivotally mounted on an inner wall of the drain body 120 by means of a pin 145, so the float body 142 can vertically pivot about the pin 145. The float lever 141 is coupled to the float valve 136, so that the float valve 136 will move vertically as the float lever 141 pivots.

When the level of the liquid stored in the float chamber 130 becomes higher than a predetermined level, the float body 142 moves upward. Then, the float valve 136 moves upward in response to the movement of the float lever 141, so that the float valve 136 opens the drain hole 135. Therefore, the liquid within the float chamber 130 is discharged to the outside through the liquid discharge channel 133 via the drain hole 135, so that liquid level is lowered. As the liquid level in the float chamber 130 is lowered, the float body 142 moves downward. Then, the float valve 136 moves downward in response to the movement of the float lever 141. When the liquid level reaches the predetermined level, the float valve 136 closes the drain hole 135. Therefore, further discharge of the liquid within the float chamber 130 is stopped.

As a result, the liquid drain 102 serves to discharge the liquid within the float chamber 130 when the liquid level exceeds the predetermined level, so that the amount of the water within the float chamber 130 may be maintained at a predetermined amount.

Liquid drains similar to the liquid drain 102 described above are taught by Japanese Laid-Open Patent Publication Nos. 62-75393 and 9-329271 and Japanese Patent Publication No. 7-92195.

However, when the liquid drain 102 is installed on vehicles, e.g., automobiles, a possibility exists that the liquid surface within the float chamber 130 may wave due to vibrations of the vehicles, which vibrations may be produced during the driving or movement of vehicles. As a result, the float 140 may shake due to the waving of the liquid surface. This phenomenon is known as a shaking phenomenon.

When the shaking phenomenon occurs, the float valve 136 coupled to the float 140 also may shake. Therefore, the liquid within the float chamber 130a may leak to the atmosphere via the liquid discharge channel 133. In addition, if the shaking is strong, the gas existing in the upper space of the float chamber 130 also may leak to the atmosphere via the liquid discharge channel together with the flow of the liquid through the discharge channel 133.

SUMMARY OF THE INVENTION

It is according an object of the present invention to teach improved techniques for preventing a float from shaking due to waving of a liquid within a float chamber.

According to one aspect of the present teachings, liquid drains are taught that may include a drain body. A float chamber may be defined within the drain body and may be adapted to store a liquid. A liquid level adjusting mechanism may serve to adjust the liquid level within the float chamber and may include a float. The float may have a float body that is adapted to float on the surface of the liquid surface within the float chamber. A damper may inhibit or minimize the movement of the float body due to waving of the liquid within the float chamber.

Therefore, the liquid level adjusting mechanism may not cause accidental leakage of the liquid to the outside even if the drain body vibrates due to vibrations transmitted from the outside. In addition, a gas that may stored in an upper space within the float chamber also may be prevented from accidental leakage. Further, the liquid level within the float chamber can be reliably adjusted to a desired level.

According to another aspect of the present teachings, the damper may interfere with the waving liquid within the float chamber. Therefore, the float will not shake even if the liquid surface within the float chamber waves.

According to another aspect of the present teachings, the damper may be disposed on the float chamber.

According to another aspect of the present teachings, the damper may include a hollow space that is defined within the float body. Therefore, the damper may have a simple construction.

According to another aspect of the present teachings, the damper may include a hollow space that is defined by an auxiliary member. The auxiliary member may be fitted onto the float body. Therefore, the float body may be designed with and without the damper in response to a required design.

According to another aspect of the present teachings, the damper may be a projection that extends outward from the float body.

According to another aspect of the present teachings, the damper may be disposed below a center of buoyancy of the float body. Therefore, the damper may always be positioned below the liquid surface, so that the damping effect can be efficiently performed.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

Figure 1:
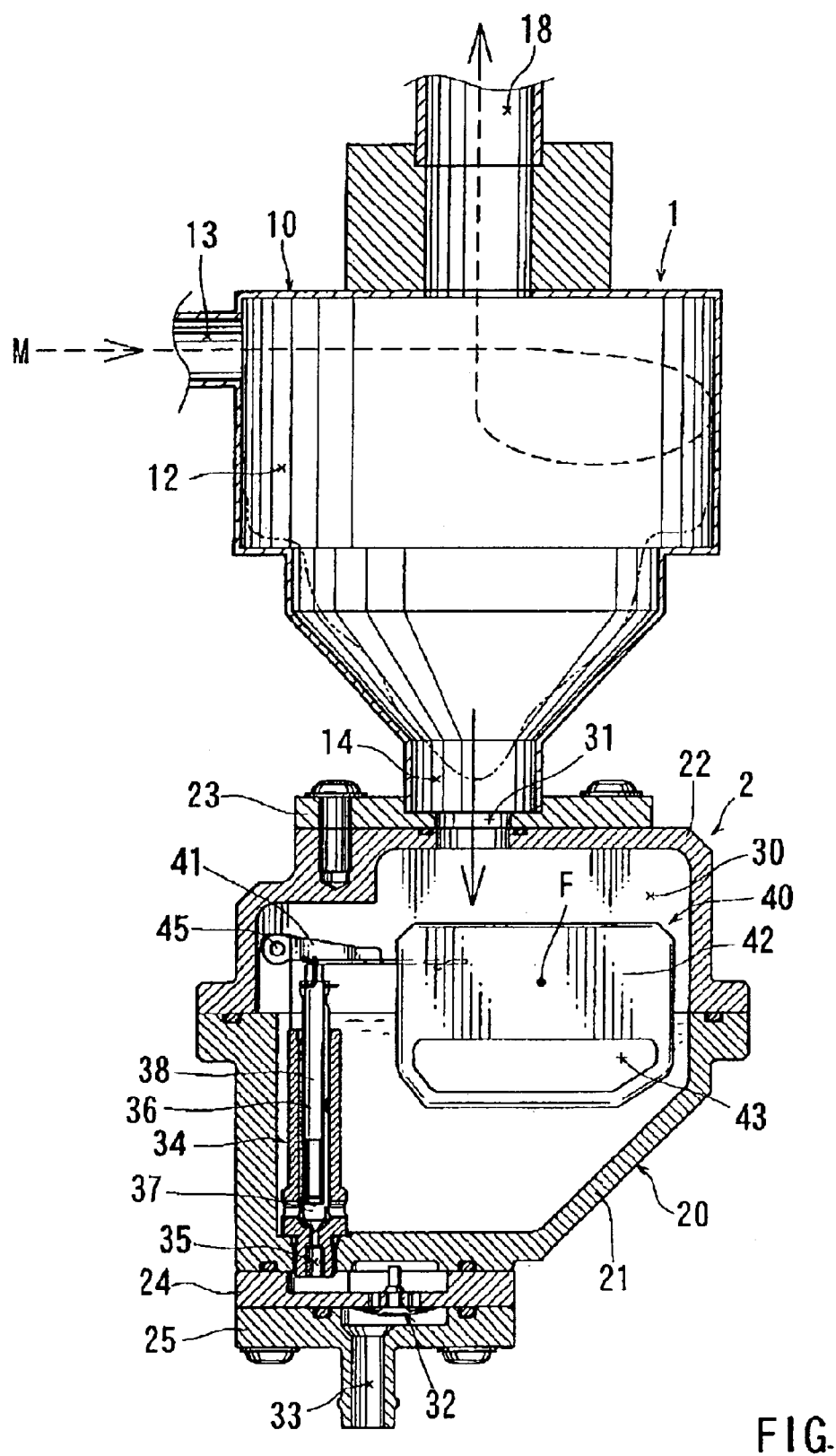
FIG. 1 is a vertical sectional view of a gas/liquid separating including a first representative liquid drain.

In one embodiment of the present teachings, liquid drains may include a drain body that defines a float chamber. The float chamber may serve to store a liquid. For example, the liquid drain may be coupled to a gas/liquid separator for separating a mixed flow of a gas (e.g., hydrogen gas) and relatively small particles of a liquid (e.g., water) into the gas and the liquid. The liquid separated by the separator may flow into the float chamber. A float may include a float body that is adapted to float on the surface of the liquid stored within the float chamber. The float body may be coupled to a valve that is operable to open and close in response to the movement of the float body. For example, the float body may vertically pivot relative to the drain body in response to the vertical position of the float body. Therefore, the valve may open to discharge a surplus amount of the liquid when the amount of the liquid stored in the float chamber exceeds a predetermined amount. A damper may be disposed below a center of buoyancy of the float body and may provide a damping effect for the liquid within the float chamber.

Therefore, the damper may inhibit or reduce a shaking phenomenon of the float body due to waving of the liquid within the float chamber even if the liquid drain receives vibrations. In case that the liquid drain is mounted on vehicles, e.g., automobiles, the vehicles may produce vibrations during the travelling of the vehicles. Such vibrations may then be transmitted to the liquid drain to cause a shaking phenomenon of the float body. However, the float body will not shake or vibrate by the waving liquid. Therefore, the valve can reliably operate to maintain the liquid level within the float chamber in response to the amount of the liquid within the float chamber.

In another embodiment of the present teachings, the damper may include a hollow space(s). The hollow space(s) may extend throughout the float body. Alternatively, the hollow space(s) may be formed not to extend throughout the float body. For example, the hollow space(s) may open on one side of the float body. Therefore, a circumferential wall of the hollow space(s) may interfere with a portion of the waving liquid. More specifically, the energy of the waving liquid may be absorbed when the portion of the waving liquid collide with the circumferential wall of the hollow space(s). As a result, the waving of the liquid may be suppressed.

In another embodiment of the present teachings, the hollow space(s) may be formed by a separate member that is fitted onto the float body. For example, the hollow space(s) may be defined between a bottom wall of the float body and an auxiliary member that is adapted to be fitted onto the float body. Preferably, the auxiliary member may be formed of a spring plate that is made of metal, so that the auxiliary member can be removably fitted onto the float body.

In another embodiment of the present teachings, the hollow space(s) may extend in a substantially horizontal direction.

In another embodiment of the present teachings, the damper may include a projection(s) that extends from the float body. Preferably, the projection(s) may be formed integrally with the float body and may extend substantially in a horizontal direction from the float body.

In another embodiment of the present teachings, the damper may include a combination of the hollow space(s) and the projection(s) described above. Alternatively, the damper may include a combination of at least two hollow spaces that have different configurations from each other.

Each of the additional features and teachings disclosed above and below may be utilized separately or in conjunction with other features and teachings to provide improved liquid drains and methods for designing and using such liquid drains. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative embodiment of the present invention will now be described with reference to FIGS. 1 to 6. FIG.

1 shows a vertical, cross sectional view of a gas/liquid separating device that includes a first representative liquid drain 2. The gas/liquid separating device also may include a gas/liquid separator 1. The gas/liquid separation device may be disposed on or within a vehicle, e.g., an automobile, and may be coupled to a device, e.g., a fuel cell, that oxidizes hydrogen gas and exhausts water.

The gas/liquid separator 1 may be configured as a cyclone type separator and may include a cyclone generating device 10 as a primary element. The cyclone generating device 10 may have a substantially cylindrical configuration. A cyclone chamber 12 may be defined within the cyclone generating device 10 and may serve as a gas/liquid separation chamber.

A gas/liquid mixture inlet port 13 may have a substantially cylindrical configuration and may be defined on an upper, lateral side of the cyclone generating device 10. The inlet port 13 may be oriented substantially in a tangential direction relative to the cyclone generating device 10. A liquid outlet port 14 may be defined on the bottom of the cyclone generating device 10 and may extend downward therefrom. A gas discharge channel 18 may extend upward from the top of the cyclone generating device 10.

A mixed gas/liquid flow M may contain a gas (e.g., hydrogen gas) and relatively small liquid particles (e.g., water particles). The mixed flow M may be supplied into the cyclone chamber 12 under relatively high pressure in the tangential direction of the cyclone generating device 10 via the mixture inlet port 13. The pressure of the gas/liquid flow M may be regulated by a pressure regulator (not shown). Therefore, the mixed flow M may circulate or swirl along the inner wall of the cyclone chamber 12. As a result, the mixed flow M may be separated into the gas and the liquid due to centrifugal force.

A float chamber 30 may be defined within the liquid drain 2. The separated liquid may flow into the float chamber 30 via the liquid outlet port 14 and then may be discharged to the outside. On the other hand, the separated gas may be discharged from the cyclone generating device 10 via the gas discharge channel 18.

Figure 2:
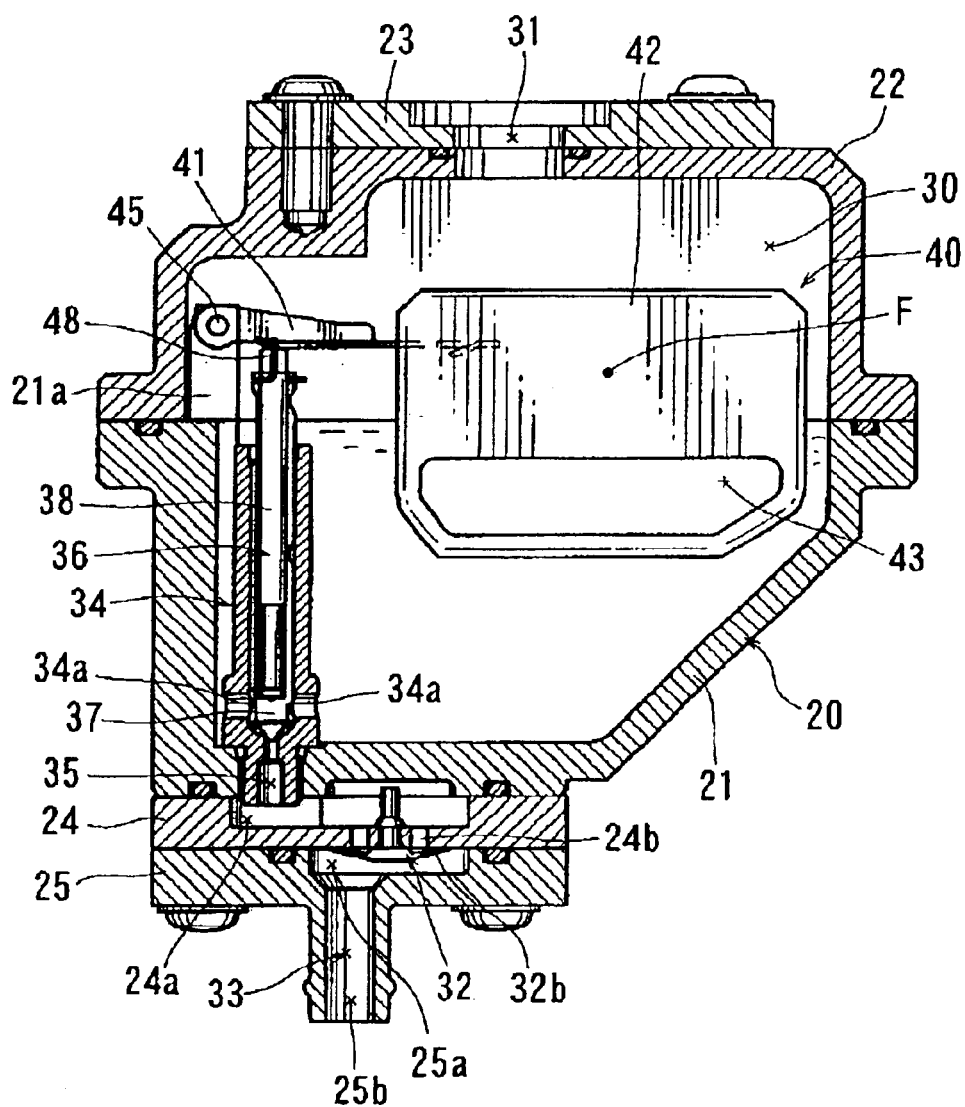
FIG. 2 is an enlarged vertical sectional view of the liquid drain.

The liquid drain 2 may include, e.g., a drain body 20, a valve seat 34, a valve 36 and a float 40. FIG. 2 shows an enlarged cross sectional view of the liquid drain 2.

Referring to FIG. 2, the drain body 20 may include a reservoir 21 having an upper opening. A lid 22 may close the upper opening of the reservoir 21. A joint plate 23 may be disposed on the upper surface of the lid 22. Further, a spacer 24 may be disposed below the lower surface of the reservoir 21 and an end plate 25 may be disposed below the lower surface of the spacer 24. The lid 22, the joint plate 23, the spacer 24 and the end plate 25 may be coupled to the reservoir 21 by a suitable fastening (tightening) mechanism, such as a bolt and a nut.

Seal rings preferably may be disposed at the respective joining (or contacting) surfaces between the lid 22 and the reservoir 21, between the joint plate 23 and the lid 22, between the spacer 24 and the reservoir 21, and between the spacer 24 and the end plate 25. The respective sealing rings are shown in FIGS. 1 and 2, but are not numbered.

The float chamber 30 may be defined between the reservoir 21 and the lid 22 and may serve as a liquid storage chamber that stores the liquid, e.g., water. A pin support portion 21a may extend from the reservoir 21 at a position adjacent to the joining or contacting surface between the reservoir 21 and the lid 22 and may extend into the lid 22.

A liquid inlet port 31 may be defined so as to extend through an upper plate portion 22a of the lid 22 and the joint plate 23 and may open at the top of the float chamber 30. The liquid outlet port 14 of the separator 1 preferably communicates with the liquid inlet port 31. Therefore, the liquid that has been separated by the separator 1 may flow downward through the liquid inlet port 31 via the liquid outlet port 14 and then may be stored within the float chamber 30.

A recess 24a may be defined in an upper surface of the spacer 24. A communication hole 24b may be defined within the spacer 24 and may extend downward from the bottom of the recess 24a and may open at the lower surface of the spacer 24. A check valve 32 may be made of resilient, elastic material, e.g., rubber, and may be frictionally fitted or pressure fitted onto the spacer 24 by utilizing the resiliency of the check valve 32. Thus, the check valve 32 can open and close the lower end of the communication hole 24b.

Therefore, the check valve 32 may resiliently deform to open the communication hole 24b when the pressure within the recess 24a exceeds a predetermined pressure. On the other hand, the check valve 32 preferably recovers its original configuration so as to close the communication hole 24b, when the pressure within the recess 24a becomes less than the predetermined pressure. In addition, the check valve 32 may prevent liquid counter flow when the pressure within the recess 24a becomes less than the pressure of the downstream side of the check valve 32. In this way, the check valve 32 may serve as a dual safety valve.

A recess 25a may be defined in an upper surface of the end plate 25 and may surround a valve head 32b of the check valve 32. Thus, when the check valve 32 opens, the recess 25a may communicate with the communication hole 24b. A liquid drain port 25b may be formed in the end plate 25. A first end of the liquid drain port 25b may communicate with the recess 25a and a second end of the liquid drain port 25b may open to the environment or to the outside of the liquid drain 2. Therefore, the recess 24a of the spacer 24, the communication hole 24b and the recess 25a and the discharge port 25b may together define a liquid discharge channel 33.

The valve seat 34 may have a substantially tubular configuration and may have a seat surface defined within a lower portion of the valve seat 34. A suitable number of openings 34a (two openings 34a are shown in FIG. 1) may be defined within the valve seat 34 in a position adjacent to and above the seat surface. The openings 34a enable the inner space of the valve seat 34 to communicate with the outside of the valve seat 34. Therefore, a liquid discharge port 35 may be defined by the space within the valve seat 34 and the openings 34a.

The lower end of the valve seat 34 may be threadably engage a corresponding threaded hole defined in the bottom of the reservoir 21. In this case, the valve seat 34 will be supported so as to extend substantially vertically within the float chamber 30. The liquid discharge port 35 may communicate with the space within the float chamber 30 and with the recess 24a of the spacer 24. Therefore, the liquid stored in the float chamber 30 may be discharged into the discharge channel 33 via the liquid discharge port 35.

The float valve 36 may be configured, e.g., as a needle valve, and may be disposed within the valve seat 34 such that the float valve 36 can move vertically relative to the valve seat 34. The float valve 36 may include a valve body 37, a needle 38 and a coil spring 39. The valve body 37 may include a tubular portion 37a that includes a top opening. The coil spring 39 may be inserted into the tubular portion 37a. The lower portion of the needle 38 also may be inserted into the tubular portion 37a, so that the needle 38 is resiliently supported by the coil spring 39. The needle 38 may vertically slide relative to the valve body 37, while the coil spring 39 applies a biasing force to the needle 38 in an upward direction.

The float valve 36 may close the liquid discharge port 35 when the valve body 37 moves downward to be seated against a seat surface that is defined within the valve seat 34 as shown in FIG. 2. On the other hand, the float valve 36 may open the liquid discharge port 35 when the valve body 37 moves (separates) upward away from the seat surface.

The float 40 may include a float lever 41 affixed to a float body 42. The float 40 preferably may be designed to float on the surface of the liquid stored within the float chamber 30. For example, the float body 42 may have a substantially parallelepiped configuration and may be made of an expanded foam rubber element that comprises a plurality of individually-formed foam pieces.

The float lever 41 may be positioned so as to extend from a portion (e.g., the left side portion as viewed in FIG. 1) of the float body 42 into the float chamber 30. One end of the float lever 41 may be connected to a pin support portion 21a of the float body 20 via a pin 45, so that the float body 42 can vertically pivot relative to the float body 20 about the pin 45. The upper portion of the float lever 41 may be coupled to the needle 38 of the float valve 36 via a clip 48, so that needle 38 of the float valve 36 can move vertically as the float body 42 pivots.

During the operation of the first representative gas/liquid separating device, the mixed gas/liquid flow M may be supplied into the cyclone generating device 10 of the gas/liquid separator 1 via the mixture inlet port 13 under relatively high pressure. Further, the pressure of the mixed flow M may be adjusted to a predetermined pressure by the pressure regulator.

The mixed flow M may be fed into the cyclone chamber 12 in the tangential direction of the cyclone generating device 10 via the mixture inlet port 13. In this case, the mixed flow M will circulate and swirl along the inner wall of the cyclone chamber 12. As a result, the mixed flow M can be separated into a liquid and a gas due to centrifugal force. Then, the liquid separated within the cyclone chamber 12 may flow downward from the cyclone chamber 12 into the float chamber 30 via the liquid outlet port 14 and the liquid inlet port 31 of the liquid drain 2 and then may be temporary stored within the float chamber 30.

On the other hand, the gas separated within the cyclone chamber 12 may be drawn into the gas discharge channel 18 by a suction pump (not shown) and then may be returned to a gas supply channel (not shown).

As the level of the liquid that is stored within the float chamber 30 of the liquid drain 2 increases, the float body 42 may rise due to its buoyancy. In this case, the float lever 41 will pivot upwardly. Therefore, the float valve 36 may move upward to open the liquid discharge port 35 and thereby allow the liquid within the float chamber 30 to flow into the discharge liquid channel 33 via the liquid discharge port 35.

If the mixed flow M is supplied into the cyclone chamber 12 of the separator 1 under elevated pressure, the space within the float chamber 30 that communicates with the cyclone chamber 12 also will be under elevated pressure. Therefore, when the float valve 36 opens, the pressure within the float chamber 30 urges the check valve 32 within the liquid discharge channel 33 to open. As a result, the liquid within the liquid discharge channel 33 may be discharged to the outside via the liquid drain port 25b.

As the liquid is discharged through the drain port 25b, the liquid level within the float chamber 30 will be lowered and the float body 42 of the float 40 may move downward due to gravity. Then, the float lever 41 pivots downward, so that the float valve 36 moves downward to close the liquid discharge port 35. Consequently, the liquid within the float chamber 30 may be prevented from being discharged and the check valve 32 within the liquid discharge channel 33 may be closed.

Thus, when the volume of the liquid stored within the float chamber 30 exceeds a predetermined volume, the liquid drain 2 may discharge the portion of the stored liquid that exceeds the predetermined amount. As a result, the amount of the liquid within the float chamber 30 may be maintained at the predetermined amount.

Figure 4:
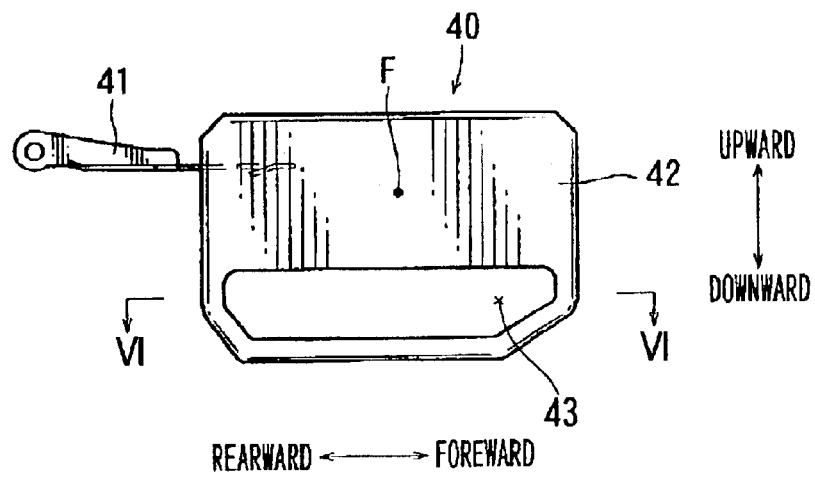
FIG. 4 is a side view of a float.
Figure 5:
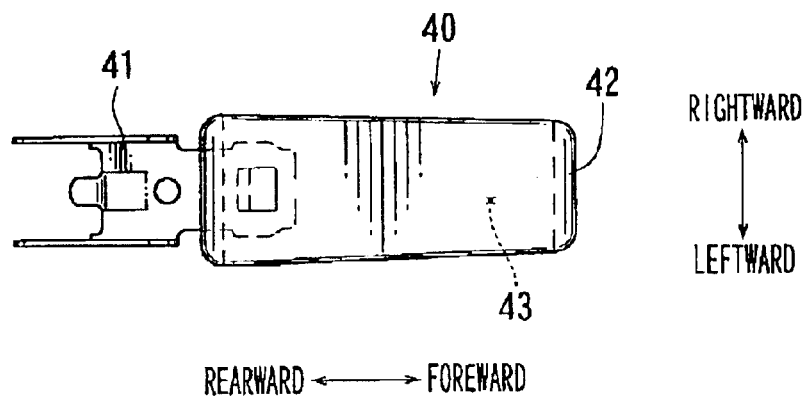
FIG. 5 is a plan view of the float.
Figure 6:
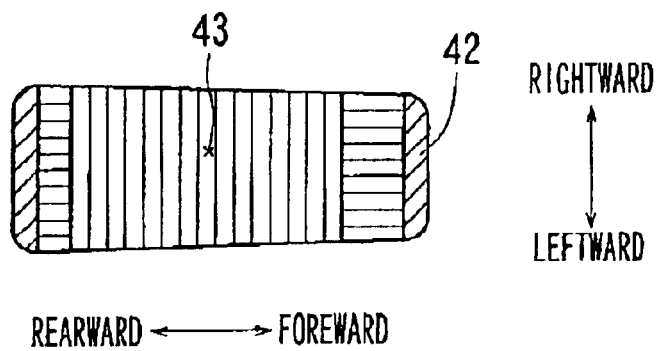
FIG. 6 is a cross sectional view taken along line VI—VI in FIG. 4.
Figure 7:
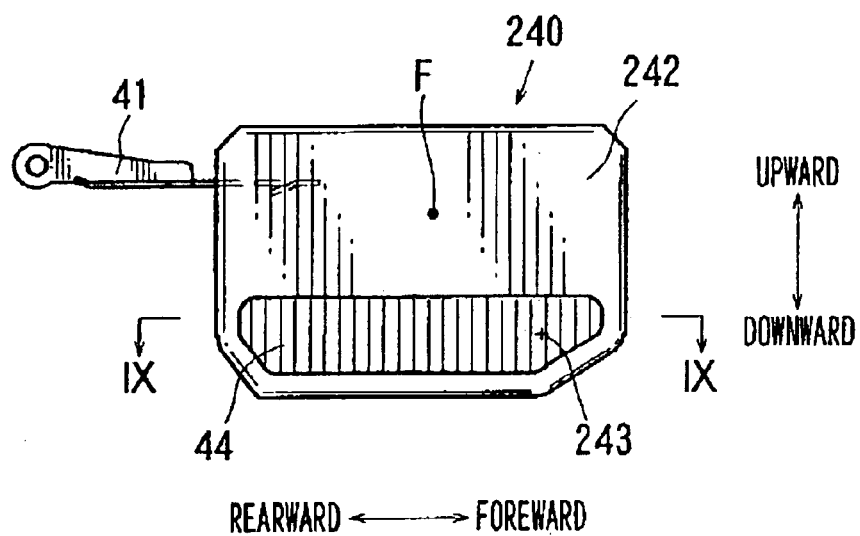
FIG. 7 is a side view of a float of a second representative liquid drain.

The float body 42 of the float 40 of this first representative embodiment will now be described in more detail with reference to FIGS. 4 to 6. FIGS. 4, 5 and 6 show a side view, a plan view and a cross sectional view taken along line VI—VI in FIG. 4 of the float body 42, respectively Referring to FIGS. 4 to 6, the float body 42 may preferably have a substantially parallelepiped configuration. The float body 42 may have a length defined in forward and rearward directions (right and left directions as viewed in FIG. 4), a height defined in a vertical direction as viewed in FIG. 4, and a width defined in a vertical direction as viewed in FIG. 5. Preferably, the length and the height of the float body 42 may be greater than the width. The float body 42 may have a buoyancy center (a center of buoyancy) F that is defined in a position as indicated in FIG. 4.

Referring to FIG. 4, a hollow space 43 may be defined within the lower portion of the float body 42 and may be positioned below the buoyancy center F.

Preferably, the hollow space 43 may extend throughout the float body 42 in the widthwise direction as shown in FIG. 6 and may have an elongated configuration in the lengthwise direction as shown in FIG. 4.

In case that the gas/liquid separating device 1 is mounted on a vehicle, e.g., an automobile, vibrations may be produced during the travelling of the vehicle and may be transmitted to the separating device 1. When this occurs; the float 40 within the float chamber 30 may shake or vibrate due to the waving or undulating liquid within the float chamber 30. However, a portion of the waving liquid may be interfered with the hollow space 43 that extends thorough the float body 42. In other words, the energy of the waving liquid may be absorbed when the portion of the waving liquid collide with a circumferential wall of the hollow space 43. As a result, the waving of the liquid may be suppressed. Therefore, the float 40 may be prevented from shaking or vibrating or the float 40 may shake or vibrate by a reduced magnitude. Thus, the hollow space 43 may serve as a damper for preventing or minimizing a float shaking phenomenon. Therefore, accidental leakage of the liquid and the gas from the liquid drain 2 may be prevented or minimized.

Figure 3:
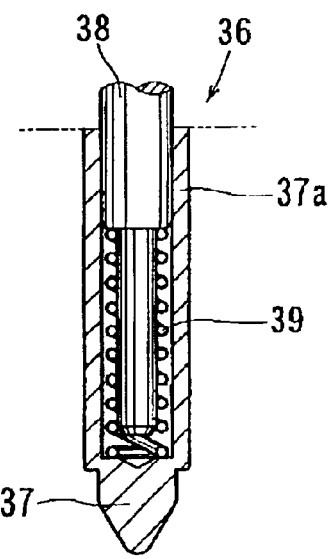
FIG. 3 is an enlarged vertical sectional view of a part of a float valve.

In addition, the liquid drain 2 includes the coil spring 39 that is interposed between the valve body 37 and the needle 38 of the float valve 36 (see FIGS. 2 and 3). Therefore, the coil spring 39 may prevent or minimize the transmission of vibrations from the needle 38 to the valve member 37. As a result, accidental leakage of the liquid and the gas may be further reliably prevented or minimized.

Second, third, fourth and fifth representative liquid drains will now be described with reference to FIGS. 7 to 17. These representative embodiments are different from the first representative liquid drain 2 only in the configuration of the float body. Therefore, illustrations of parts other than the float body will not be necessary. In addition, in FIGS. 7 to 17, like members are given the same reference numerals as the first representative liquid drain 2.

Figure 8:
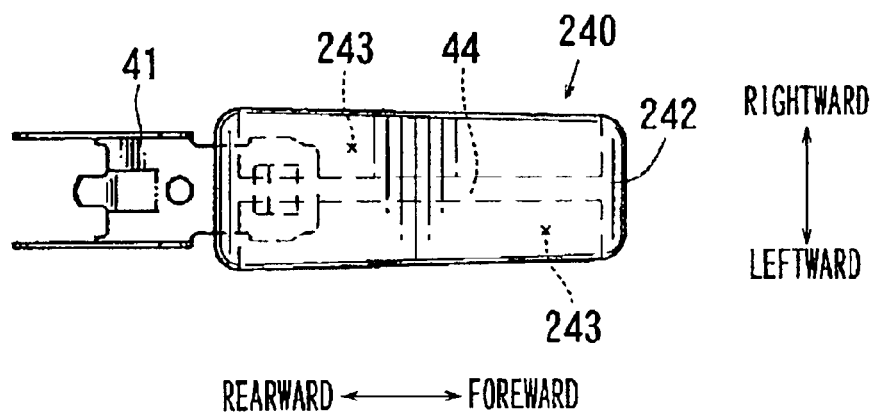
FIG. 8 is a plan view of the float.
Figure 9:
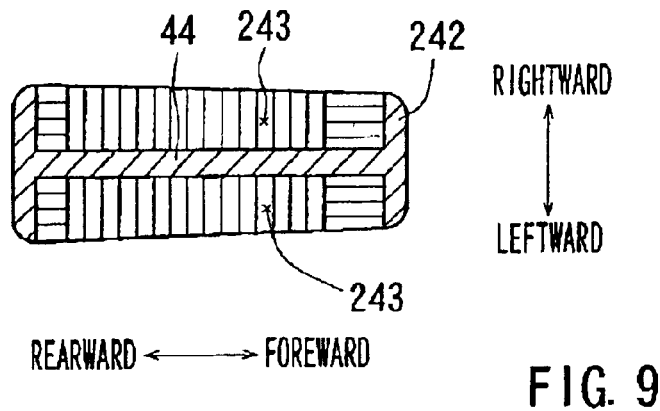
FIG. 9 is a cross sectional view taken along line IX—IX in FIG. 7.

The second representative liquid drain may have a float 240 that is shown in a side view, a plan view and a cross sectional view taken along line IX—IX in FIG. 8, respectively.

The float 240 may include a float body 242. A pair of hollow spaces 243 may be defined in the float body 242. The hollow spaces 243 may correspond to the hollow space 43 of the float 41 of the first representative liquid drain 2 shown in FIGS. 4 to 6 The hollow spaces 243 may be defined on both sides in the widthwise direction (in the vertical direction as viewed in FIGS. 8 and 9) of the float body 42 and may be separated by a flat partition wall 44. Thus, in this representative embodiment, the hollow spaces 243 may be configured as recesses that do not extend throughout the float body 242.

In the same manner as the hollow space 43 of the float 41 of the first representative liquid drain 2, the hollow spaces 243 of the float 240 may serve as a damper for preventing or minimizing a shaking phenomenon of the float 240 when vibrations are applied to the liquid drain.

Figure 10:
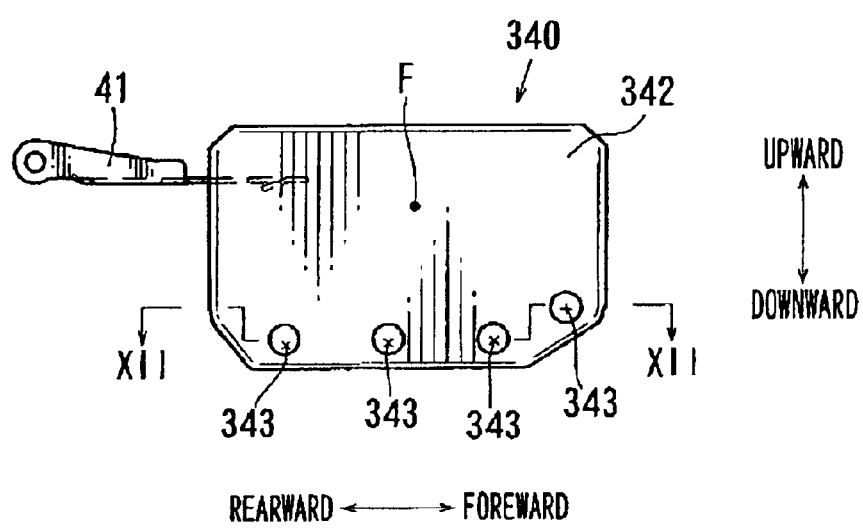
FIG. 10 is a side view of a float of a third representative liquid drain.
Figure 11:
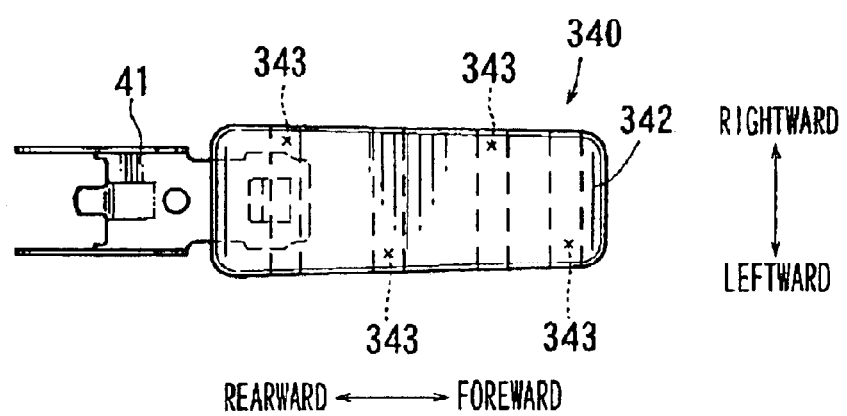
FIG. 11 is a plan view of the float.
Figure 12:
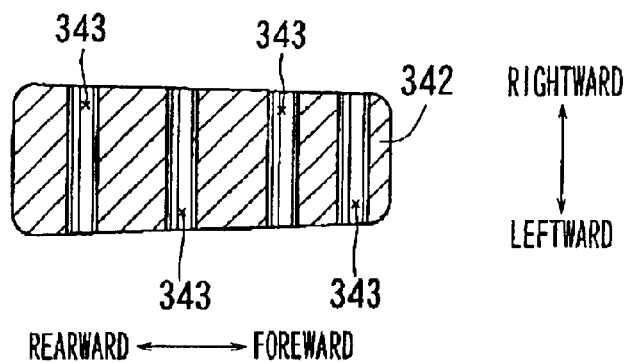
FIG. 12 is a cross sectional view taken along line XII—XII in FIG. 10.

The third representative liquid drain may have a float 340 that is shown in FIGS. 10, 11 and 12 in a side view, a plan view and a cross sectional view taken along line X—X in FIG. 11, respectively.

The float 340 may include a float body 342. A plurality of holes 343 (four holes 343 are shown in the drawings) may be defined within the float body 342 and may extend throughout the float body 342 in the widthwise direction. The holes 343 may correspond to the hollow space 43 of the float 40 of the first representative liquid drain 2. The holes 343 may be spaced from each other by a suitable distance in the lengthwise direction (right and left directions as viewed in FIG. 12) of the float body 342. Also in this representative embodiment, the holes 343 preferably may be positioned below the center of buoyancy of the float 340.

In the same manner as the hollow space 43 of the float 41 of the first representative liquid drain 2, the holes 343 of the float 340 may serve as a damper for preventing or minimizing a shaking phenomenon of the float 340 when vibrations are applied to the liquid drain.

Figure 13:
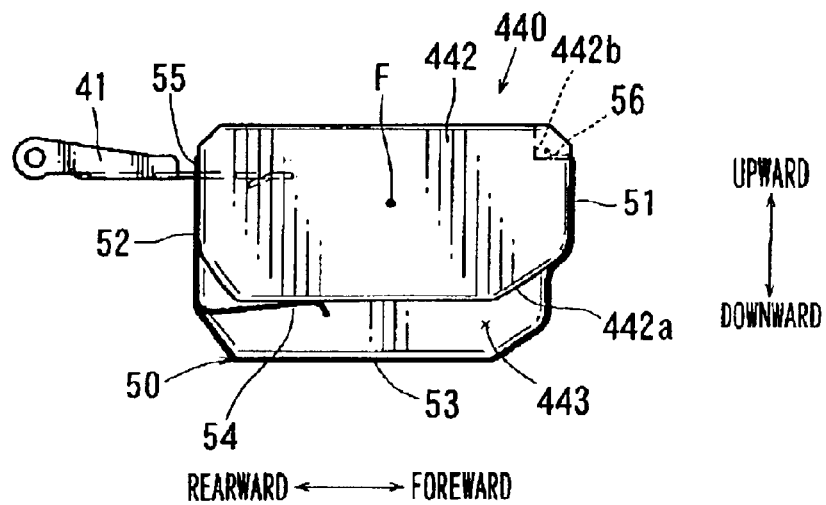
FIG. 13 is a side view of a float of a fourth representative liquid drain.
Figure 14:
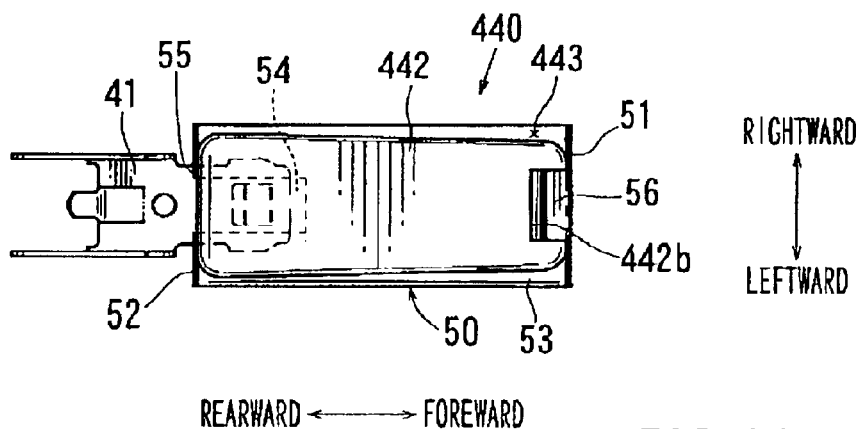
FIG. 14 is a plan view of the float.

The fourth representative liquid drain may have a float 440 that is shown in FIGS. 13 and 14 in a side view and a plan view, respectively.

The float 440 may include a float body 442 and an auxiliary member 50. Preferably, the auxiliary member 50 may be formed by a spring plate that is made of metal. The auxiliary member 50 may be resiliently deformed so as to be fitted onto the float body 442. In the fitted state, a hollow space 443 may be defined between the auxiliary member 50 and the float body 442. Preferably, the float body 442 may have a height (in the upward and downward direction as viewed in FIG. 13) that is less than the height of the float body 42 of the first representative embodiment. In addition, no hollow space may be defined in the float body 442. Thus, in this representative embodiment, the hollow space 443 defined by the fitting member 50 may serve as a damper in the same manner as the hollow space 43 of the float body 42 of the first representative liquid drain 2.

Preferably, the auxiliary member 50 may be formed by bending a flat strip-like spring plate in a substantially U-shaped configuration and may have a front portion 51, a rear portion 52 and a bottom portion 53. After the spring plate has been bent, a substantially U-shaped cut line (not shown) may be formed in the spring plate so as to extend from the rear end to the middle of the bottom portion 53. A part of the bottom portion 53 surrounded by the cut line may then be bent upward, so that a pressing piece 54 may be defined as shown in FIG. 13. When the auxiliary member 50 is fitted onto the float body 442, the pressing piece 54 may be pressed against the bottom surface of the float body 442.

A bifurcated part 55 may be defined on the upper side of the rear portion 52 and may have a pair of fingers. The front portion of the float lever 41 may extend through a space defined between the fingers of the bifurcated part 55 and then may be inserted into the float body 442.

Preferably, the front portion 51 may be folded in a stepped manner so as to extend along the front surface of the float body 442 and also along a part of an inclined surface 442a defined on the float body 442. The inclined surface 442a may extend to connect the front surface to the bottom surface of the float body 442. An engaging portion 56 may be defined on the upper end of the front portion 51 of the auxiliary member 50. The engaging portion 56 may engage an engaging recess 42b that is defined in the front upper corner of the float body 442. Preferably, the engaging portion 56 may be formed by bending the upper end of the front portion 51 in the rearward direction.

In order to fit the auxiliary member 50 onto the float body 442, the auxiliary member 50 may be pushed upward toward the float body 442 from the lower side of the float body 442. Then, the front portion 51 and the rear portion 52 of the auxiliary member 50 may be resiliently deformed along the front surface and the rear surface of the float body 442. The fitting operation may be completed when the engaging portion 56 of the auxiliary member 50 engages the engaging recess 42b as shown in FIG. 13. In this state, the rear portion 52 of the auxiliary member 50 may closely contact with the rear surface of the float body 442. In addition, the front portion 51 may closely contact with the front surface and the inclined surface 442a of the float body 442. Further, the front end of the pressing piece 54 may be pressed against the bottom surface of the float body 442, so that the auxiliary member 50 may be prevented from being accidentally removed from the float body 442.

When the auxiliary member 50 is fitted onto the float body 442, the hollow space 443 may be defined between the bottom surface of the float body 442 and the bottom portion 53 of the auxiliary member 50. Similar to the first representative embodiment, a center of buoyancy F of the float body 442 may be positioned above the hollow space 443 (see FIG. 13). In addition, the hollow space 443 may be opened on both sides in the widthwise direction of the float body 442. Therefore, the hollow space 443 also may serve as a damper in the same manner as the hollow space 43 of the float body 42 of the first representative liquid drain 2.

In addition, because the auxiliary member 50 that defines the hollow space 443 is a separate member from float body 442, the representative liquid drain may be selectively designed with and without a damper in response to the required performance required. In other words, the float 442 also may be used as a float for a liquid drain that is adapted to be mounted on a fixed place that does not receive vibrations. Therefore, the versatility of the liquid drain may be improved.

Figure 15:
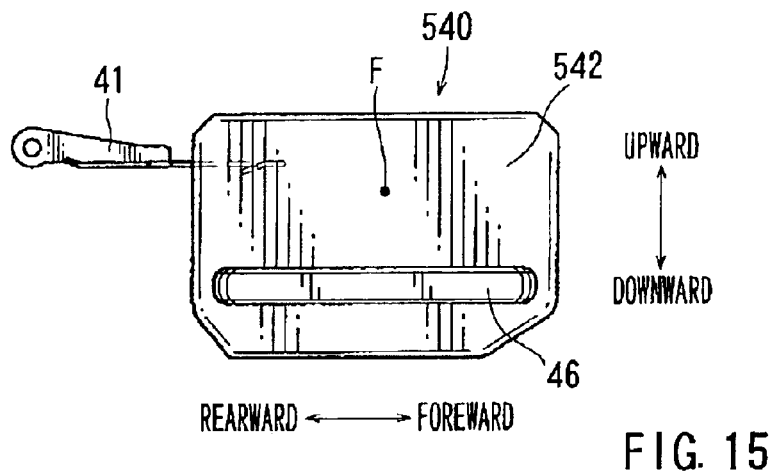
FIG. 15 is side view of the float.
Figure 16:
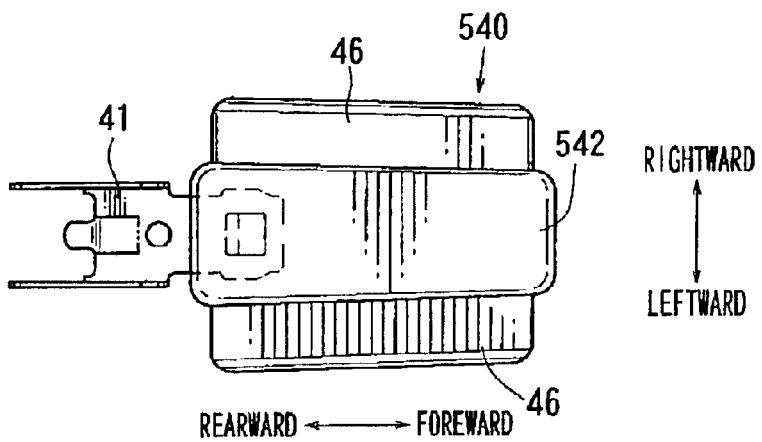
FIG. 16 is a plan view of the float.
Figure 17:
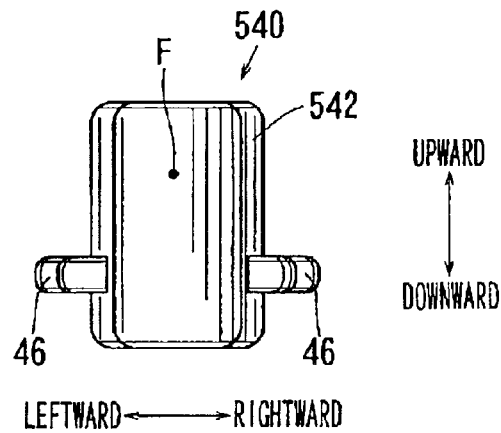
FIG. 17 is a front view of the float.
Figure 18:
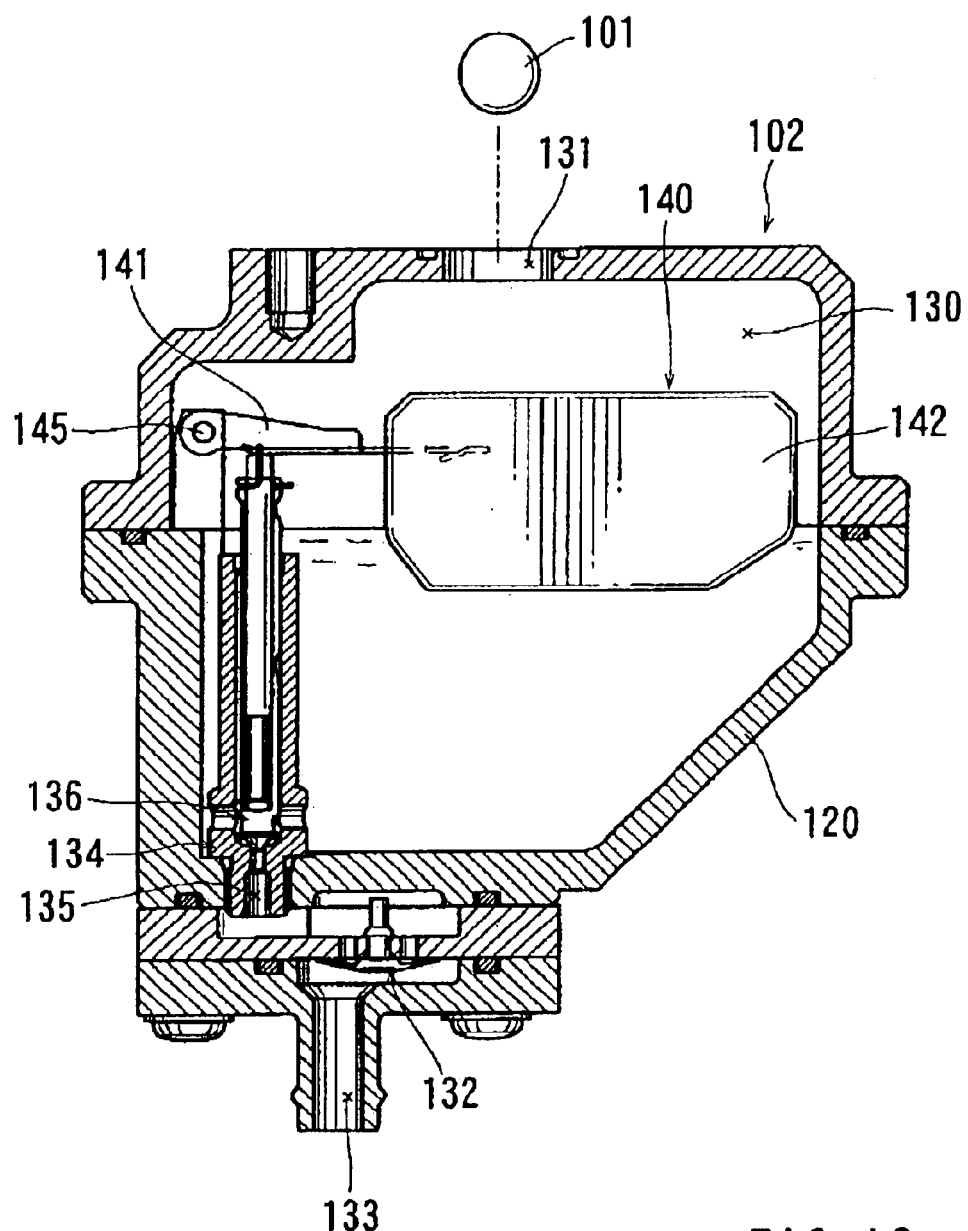
FIG. 18 is a vertical sectional view of a known liquid drain.

The fifth representative liquid drain may have a float 540 that is shown in FIGS. 15, 16 and 17 in a side view, a plan view and a front view, respectively.

The float 540 may include a float body 542. The float body 542 may not include a hollow space as in the float 42 of the first representative embodiment. Instead, the float 540 may include a pair of projections 46 as shown in FIG. 17. The projections 46 may extend from both right and left sides of the float body 542. Preferably, the projections 46 may be configured as flat fins that extend horizontally, or substantially perpendicular to the right and left walls of the float body 542.

Also in this representative embodiment, a center of buoyancy of the float body 542 may be positioned above the projections 46 and the projections 46 may serves as a damper when the float 540 shakes due to vibrations. Thus, the upper and lower surfaces of each of the projections 46 may interfere with a portion the waving or undulating liquid within the float chamber 30.

The present invention may not be limited to the embodiments described above but may modified in various ways. For example, the number, position and configuration of the hollow space(s) 43, 243, 343 and 443 and the projections 46 of the above representative embodiments may be selectively determined in response to various designs of liquid drains. In addition, each of the hollow space(s) 43, 243, 343 and 443 may be incorporated in combination with the projections 46. In such a design, the hollow space(s) and the projections may preferably be disposed below the center of buoyancy of a float body. Thus, various designs are possible as long as the hollow space and/or the projection can operate as a damper (s).

What is claimed is:

1. A liquid drain comprising:
    a drain body defining a float chamber, wherein the float chamber is arranged and constructed to store a liquid,
    a liquid level adjusting mechanism arranged and constructed to adjust the liquid level within the float chamber and including a float, wherein the float includes a float body arranged and constructed to float on a surface of the liquid stored within the float chamber, and
    a damper arranged and constructed to inhibit or minimize the movement of the float body due to waving of the liquid within the float chamber.

2. A liquid drain as in claim 1, wherein the damper is disposed on the float body.

3. A liquid drain as in claim 2, wherein the damper is disposed below a center of buoyancy of the float body.

4. A liquid drain as in claim 2, wherein the damper comprises a hollow space that is defined within the float body and opens to the outside of the float body.

5. A liquid drain as in claim 4, wherein the hollow space extends in a substantially horizontal direction.

6. A liquid drain as in claim 5, wherein the hollow space extends throughout the float body.

7. A liquid drain as in claim 5, wherein the hollow space extends partly within the float body.

8. A liquid drain as in claims 2, wherein the damper comprises an auxiliary member that is fitted onto the float body and wherein a hollow space is defined between the auxiliary member and the float body and is opened to the outside.

9. A liquid drain as in claim 8, wherein the hollow space extends in a substantially horizontal direction.

10. A liquid drain as in claim 8, wherein the auxiliary member is removably fitted onto the float body.

11. A liquid drain as in claim 8, wherein the auxiliary member is formed by a spring plate.

12. A liquid drain as in claim 2, wherein the damper comprises a projection that extends outward from the float body.

13. A liquid drain as in claim 12, wherein the projection extends in a substantially horizontal direction from the float body.

14. A liquid drain as in claim 13, wherein the projection is formed integrally with the float body.

15. A liquid drain as in claim 1, wherein the damper is arranged and constructed to interfere with the waving liquid within the float chamber.

16. A liquid drain as in claim 1, wherein the liquid level adjusting mechanism includes a valve arranged and constructed to open and close in response to the movement of the float, wherein the valve opens to discharge a surplus amount of the liquid when the amount of the liquid stored in the float chamber exceeds a predetermined amount.

17. An apparatus comprising a gas/liquid separator and a liquid drain as in claim 1, wherein the gas/liquid separator is arranged and constructed to separate a mixed gas/liquid flow that contains a gas and a liquid, and the liquid drain is coupled to the gas/liquid separator, so that the separated liquid flows into the float chamber of the liquid drain.

18. A liquid drain as in claim 1, wherein the float body comprises a plurality of dampers.

19. A liquid drain comprising:
    a drain body;
    a float chamber defined within the drain body and arranged and constructed to store a liquid,
    a float having a float body, wherein the float body is arranged and constructed to float on a surface of the liquid stored within the float chamber,
    a valve arranged and constructed to open and close in response to the movement of the float body, wherein the valve opens to discharge a surplus amount of the liquid when the amount of the liquid stored in the float chamber exceeds a predetermined amount, and
    a damper disposed below a center of buoyancy of the float body and arranged and constructed to provide a damping effect for the liquid within the float chamber.

20. A liquid drain as in claim 19, wherein the damper comprises a hollow space that extends throughout the float body.

21. A liquid drain as in claim 19, wherein the damper comprises a hollow space that does not extend throughout the float body.

22. A liquid drain as in claim 19, wherein the damper comprises a projection that extends from the float body.

* * * * *